(12) United States Patent
Nix

(10) Patent No.: US 8,127,759 B2
(45) Date of Patent: Mar. 6, 2012

(54) WEDGE SHAPE SOLAR COOKER

(76) Inventor: Martin E. Nix, Seattle, WA (US)

( * ) Notice: Subject to any disclaimer, the term of this patent is extended or adjusted under 35 U.S.C. 154(b) by 726 days.

(21) Appl. No.: 12/284,177

(22) Filed: Sep. 19, 2008

(65) Prior Publication Data

US 2010/0071686 A1 Mar. 25, 2010

(51) Int. Cl.
*F24J 2/00* (2006.01)
*F24J 2/02* (2006.01)
*F24J 2/36* (2006.01)

(52) U.S. Cl. ........ 126/682; 126/627; 126/680; 126/681; 126/687; 126/696

(58) Field of Classification Search ............... 126/682, 126/627, 680, 681, 684, 685, 687, 696; F24J 2/00, F24J 2/02, 2/36
See application file for complete search history.

(56) References Cited

U.S. PATENT DOCUMENTS

| | | | | |
|---|---|---|---|---|
| 2,520,578 A * | 8/1950 | Treloar | ........................ | 126/25 R |
| 2,859,745 A | 5/1954 | Von Brudersoorf | | |
| 3,028,856 A * | 4/1962 | Deall | ............................ | 126/600 |
| 3,038,463 A * | 6/1962 | Deall | ............................ | 126/682 |
| 3,106,201 A * | 10/1963 | Steinberg | ........................ | 126/682 |
| 3,301,171 A * | 1/1967 | Steinberg | ........................ | 99/425 |
| 3,463,577 A * | 8/1969 | Friedberg | ........................ | 359/855 |
| 3,938,497 A | 2/1976 | Andrassy | | |
| 4,077,391 A | 3/1978 | Way | | |
| 4,082,079 A | 4/1978 | Rodgers | | |
| 4,083,357 A | 4/1978 | Fischer | | |
| 4,125,109 A * | 11/1978 | Erwin | ........................ | 126/681 |
| 4,127,104 A * | 11/1978 | Greene | ........................ | 126/640 |
| 4,130,106 A | 12/1978 | Clevett | | |
| 4,196,721 A | 4/1980 | Posnansky | | |
| 4,203,427 A * | 5/1980 | Way, Jr. | ........................ | 126/681 |
| 4,236,508 A | 12/1980 | Kerr | | |
| 4,249,511 A * | 2/1981 | Krisst et al. | ........................ | 126/608 |
| 4,284,071 A * | 8/1981 | Steinberg | ........................ | 126/681 |
| 4,292,957 A * | 10/1981 | Golder | ........................ | 126/682 |
| 4,378,790 A | 4/1983 | Erwin | | |
| 4,398,053 A * | 8/1983 | Orillion | ........................ | 136/248 |
| 4,417,566 A * | 11/1983 | Steinberg | ........................ | 126/682 |
| 4,446,854 A * | 5/1984 | Clevett et al. | ........................ | 126/682 |
| 4,619,244 A | 10/1986 | Marks | | |
| 4,655,196 A * | 4/1987 | Kerr | ........................ | 126/606 |
| 4,696,285 A * | 9/1987 | Zwach | ........................ | 126/604 |
| 4,848,320 A | 7/1989 | Burns | | |
| 4,850,339 A | 7/1989 | Ghatak | | |

(Continued)

FOREIGN PATENT DOCUMENTS

CH 624208 A * 7/1981

(Continued)

*Primary Examiner* — Steven B McAllister
*Assistant Examiner* — Daniel E Namay

(57) ABSTRACT

Developed is a solar cooker with triangle reflective sides. Above and below are two movable solar reflecting panels that can be adjusted to focus light onto a frying pan using a glass lid, an insulating pad, and a surrounding plastic bag to trap solar light for cooking. The triangle reflective sides are used also to adjust and support the two movable solar reflecting panels via movable pegs. In the corners adjacent to the triangle sides, back reflective plate and reflective floor plate is an invented reflective-tilted-equilateral-triangle-plate with each of the three angles at 60 degrees in all three horizontal and vertical dimensions, to capture and reflect light towards the solar cooking area dishware. At night the entire solar cooker can be folded down to form a storage space. The entire solar cooker is foldable for shipping.

1 Claim, 5 Drawing Sheets

U.S. PATENT DOCUMENTS

Figure 1:
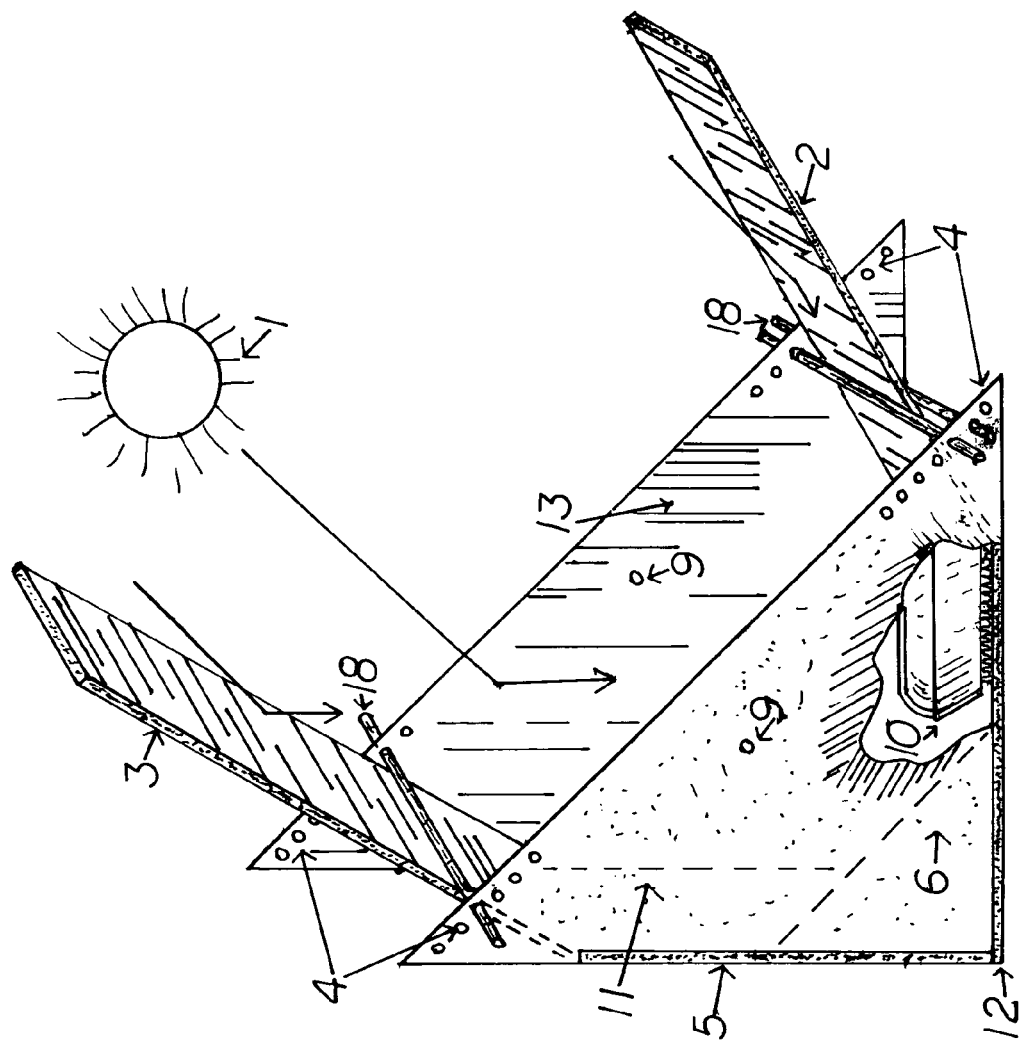

| | | | | |
|---|---|---|---|---|
| 5,007,403 A * | 4/1991 | Chen | .......................... | 126/25 R |
| 5,090,369 A * | 2/1992 | Weng | .......................... | 122/44.2 |
| 5,113,845 A | 5/1992 | Nix | | |
| 5,139,010 A | 8/1992 | Borgens | | |
| 5,524,610 A * | 6/1996 | Clark | .......................... | 126/682 |
| D387,238 S * | 12/1997 | Rodgers | .......................... | D7/324 |
| 5,829,427 A * | 11/1998 | Gallois-Montbrun | ........ | 126/600 |
| 6,606,988 B2 * | 8/2003 | Clark | .......................... | 126/696 |
| D484,736 S | 1/2004 | Sarnoff | | |
| 2007/0199563 A1 * | 8/2007 | Fox | .............................. | 126/684 |
| 2009/0314282 A1 * | 12/2009 | Trumbull | ..................... | 126/628 |
| 2010/0206303 A1 * | 8/2010 | Thorne | ........................ | 126/696 |

FOREIGN PATENT DOCUMENTS

| | | | |
|---|---|---|---|
| DE | 4218403 | A1 * | 10/1992 |
| DE | 4338736 | A1 * | 5/1995 |
| DE | 102007056456 | A1 * | 5/2009 |

\* cited by examiner

WEDGE SHAPE SOLAR COOKER

FIELD OF INVENTION

Invented is a new utility design of an ergonomic solar cooker using a system of folding and reflective plates to focus the sun's energy onto a solar absorbing frying pan.

PRIOR ART

Solar cooking is not new, but what has been advancing is the art of making it more useful and convenient for users. One of the earliest designs were early people using rocks heated by sunlight to cook food.

U.S. Pat. No. 2,859,745 (von Brudersdorff, May 4, 1954) illustrates an early art using a curved surface to focus the sun's energy onto a cooking surface.

U.S. Pat. No. 3,938,497 (Andrassy, Feb. 17, 1976) illustrates a tracking solar cooker with movable reflecting sides, focusing the sun's energy into a cooking oven, which is designed to be constantly level.

U.S. Pat. No. 4,077,391 (Way, Mar. 7, 1978) illustrates a portable solar cooker using a plurality of adjustable sun reflectors, focusing the sun's energy below a transparent window.

U.S. Patent Apr. 4, 1978 (Rodgers, Apr. 4, 1978) illustrates an oven and grill with reflecting panels above, below, on the sides and in the corners, focusing the sun's energy into a cooking chamber.

U.S. Pat. No. 4,130,106 (Clevett, Dec. 19, 1978) illustrates a solar stove having four rectangular reflective panels, with adjacent triangular reflectors. The interior of the drawer is dark to absorb solar energy.

U.S. Pat. No. 4,196,721 (Posmansky, Apr. 8, 1980) illustrates the use of a vacuum for trapping solar heat into a flask to heat a liquid.

U.S. Pat. No. 4,236,508 (Kerr, Dec. 2, 1980) illustrates a kit to teach principals involving insulation, reflection, solar ray conversion to solar heat, and the fine art of solar cookery.

U.S. Pat. No. 4,619,244 (Marks, Oct. 28, 1986) illustrates a solar heater using phase-change materials, thus illustrating the use of thermal mass for solar heat storage.

U.S. Pat. No. 4,655,196 (Kerr, Apr. 7, 1987) illustrates a solar cooker that can be installed in a wall of a home or building.

U.S. Pat. No. 4,848,320 (Burns, Jul. 18, 1989) illustrates a solar oven with a collapsible reflector assembly with an interior cooking chamber.

U.S. Pat. No. 4,850,339 (Ghatak, Jul. 25, 1989) illustrates a solar oven with a rectangular cooking pan.

U.S. Pat. No. 5,113,845 (Nix, May 19, 1992) illustrates the use of a reflecting adjustable table top, to reflect light downward onto a parabolic surface. Unique is a solar oven with dual glass chambers with an overhead solar absorbing cast iron plate. The entire oven is surrounded by a high temperature plastic bag.

U.S. Pat. No. D484,736 (Surmoff, Jan. 6, 2004) shows the design of a foil tent that can be used as a roaster.

All of the above art illustrate that solar cooking technology has grown considerably, integrating the basic principles of heat transfer. The invented device improves upon the technology.

SUMMARY OF INVENTION

Described is an improvement in the art of solar cooking, cooking food with sunlight. Described is a triangle shaped cooker, with two reflective left or right triangle-shaped-reflective-side-plate. Above and below are a moveable-lower-reflective-panel and a moveable-upper-reflective panel, held in place by pegs and holes. These moveable reflective panels are adjusted so as to redirect sunlight downwards and towards a design of cookware, using a frying pan. At the back is a vertical-reflective-back-plate, and on the floor is another horizontal-reflective-floor-plate, which directs sunlight to the solar cooking area. In the corner, where the back plate, floor plate and also one of the triangle-shaped-reflective-side-plate meet, is an equilateral triangle. This equilateral triangle is angled at 60 degrees in all directions, and captures sunlight from either of the two moveable reflective panels, or from the reflective back plate, or from the sun directly. The claimed reflective tilted-equilateral-triangle-plate with each of the three angles at 60 degrees in all three horizontal and vertical dimensions thus is able to redirect the sun's solar energy and concentrate the sun's solar energy towards the solar cooking area dishware.

The frying pan is covered by a clear, perhaps glass, lid. Underneath the frying pan is an insulating pad, so as to insulate the bottom. Surrounding the entire assembly is a clear plastic bag, designed to trap solar heat. This plastic bag can be made of high temperature resistant plastic, and works much like a greenhouse.

At night when the invented device is not used, the upper and lower reflective panels can be lowered to create an interior cavity thus storing the frying pan and other accessories. A peg and hole assembly locks the lowered reflective panels.

The solar cooker is pointed at the sun at least hourly, during sunny conditions. The device is more ergonomic in that it has a small "foot print" and thus uses less floor or table space when in use. It is easy to use, and understand. Temperatures have been measured at 300 F. degrees, capturing close to 1,000 BTUs per hour, in test. The device is also foldable for easy shipping.

The solar cooker is an improvement in the culinary art of solar cooking. It can be made out of plastic, metal, wood, cardboard or other suitable materials. The reflective surface can be aluminum mylar (potato chip bags) or silver mylar, or electroplated with aluminum oxide, gold, silver, or other reflective materials. The dishware can be commonly found at thrift stores, thus making the invented device affordable and easy to make. The device also can be used for other applications like distillation of water or alcohols, drying fruit or fish, disinfecting medical instruments, or sterilization.

FIGURES

FIG. 1. Illustrates a isometric view of the invented device. Shown are a moveable-upper-reflective-panel and a moveable-lower-reflective panel held in place by moveable pegs. On the side are a left triangle-shaped-reflective-side-plate and a right triangle-shaped-reflective-side-plate that also have holes for holding in place the pegs. A cutaway is shown for the solar cooking area dishware FIG. 2. Illustrates a side view of the invented device. Shown are two moveable reflective panels, held in pace by moveable pegs. On the side is shown one of the triangle-shaped-reflective-side-plate. Also shown are the holes for holding the pegs. A cutaway is shown for the solar cooking area dishware.

Figure 3:
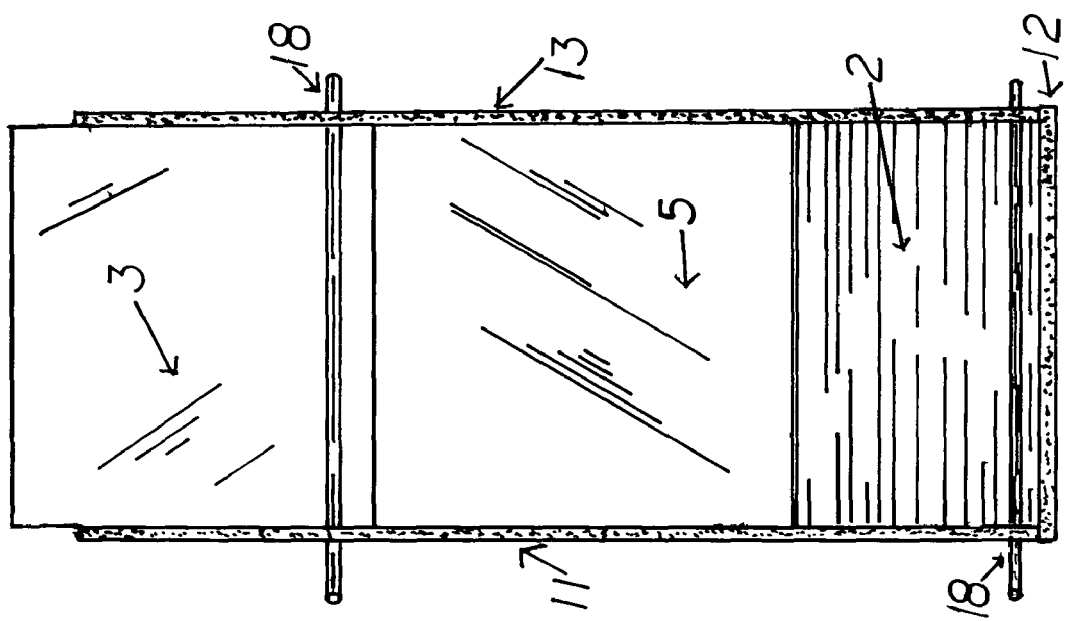

FIG. 3. Illustrates the frontal view of the invented device. Shown are two moveable reflective panels, held in place by moveable pegs. Also shown are the vertical-reflective-back-plate, and the horizontal-reflective-floor-plate.

Figure 4:
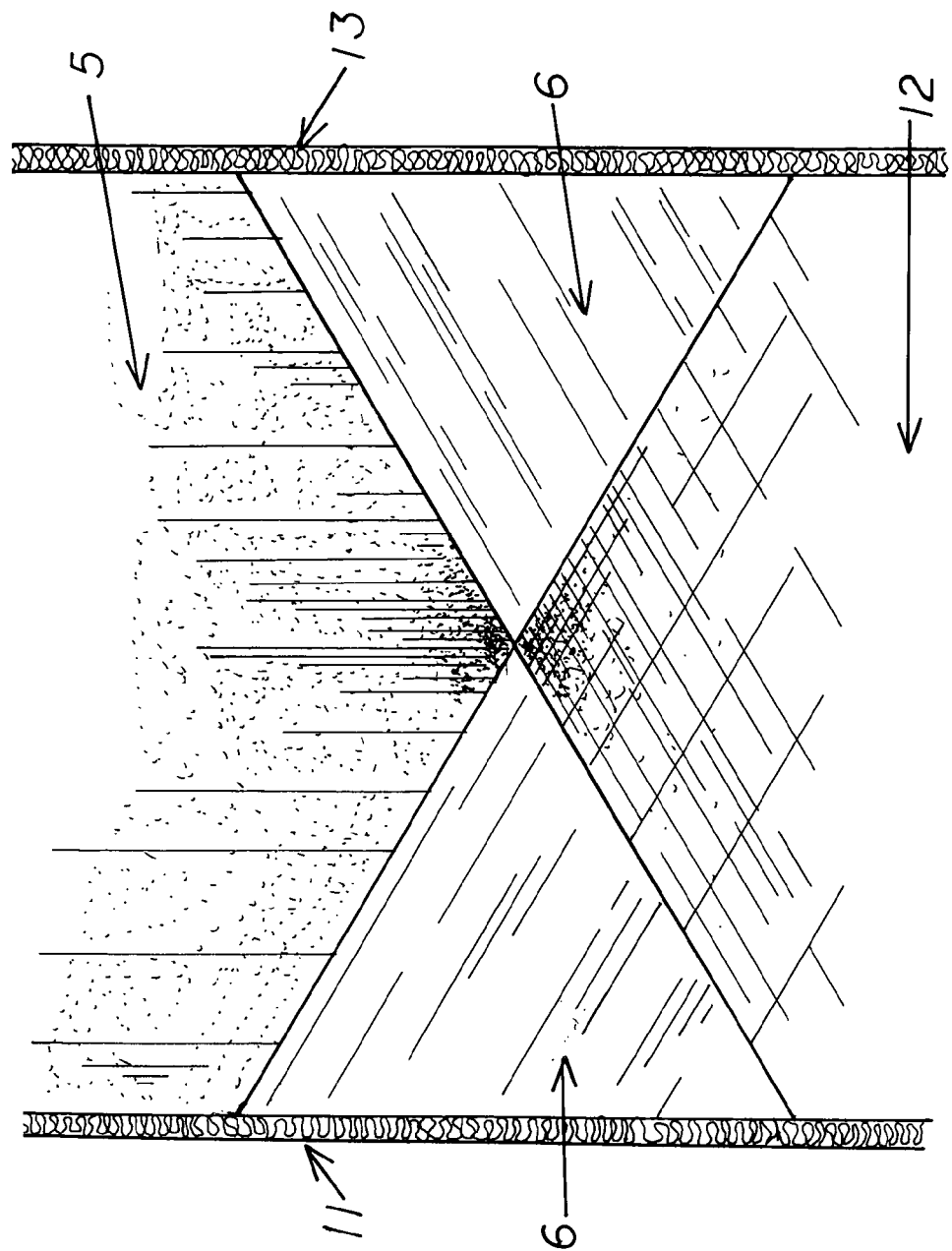

FIG. 4. illustrates the claimed reflective tilted-equilateral-triangle-plate with each of the three angles at 60 degrees in all three horizontal and vertical dimensions. This triangle is placed in the corner adjacent to one of the left or right triangle-shape-reflective-side-plate, and adjacent to the horizontal-reflective-floor-plate and vertical-reflective-back-plate. The net result is to capture direct sunlight, sunlight from the reflective triangle-shaped-reflective-side-plate and horizontal-reflective-floor-plate and vertical-reflective-back-plate and from the moveable-upper-reflective-plate and moveable-lower-reflective-plate, and redirect sunlight to focus on the solar cooking are dishware. The net result is numerous suns are focused onto the solar cooking area dishware.

Figure 5:
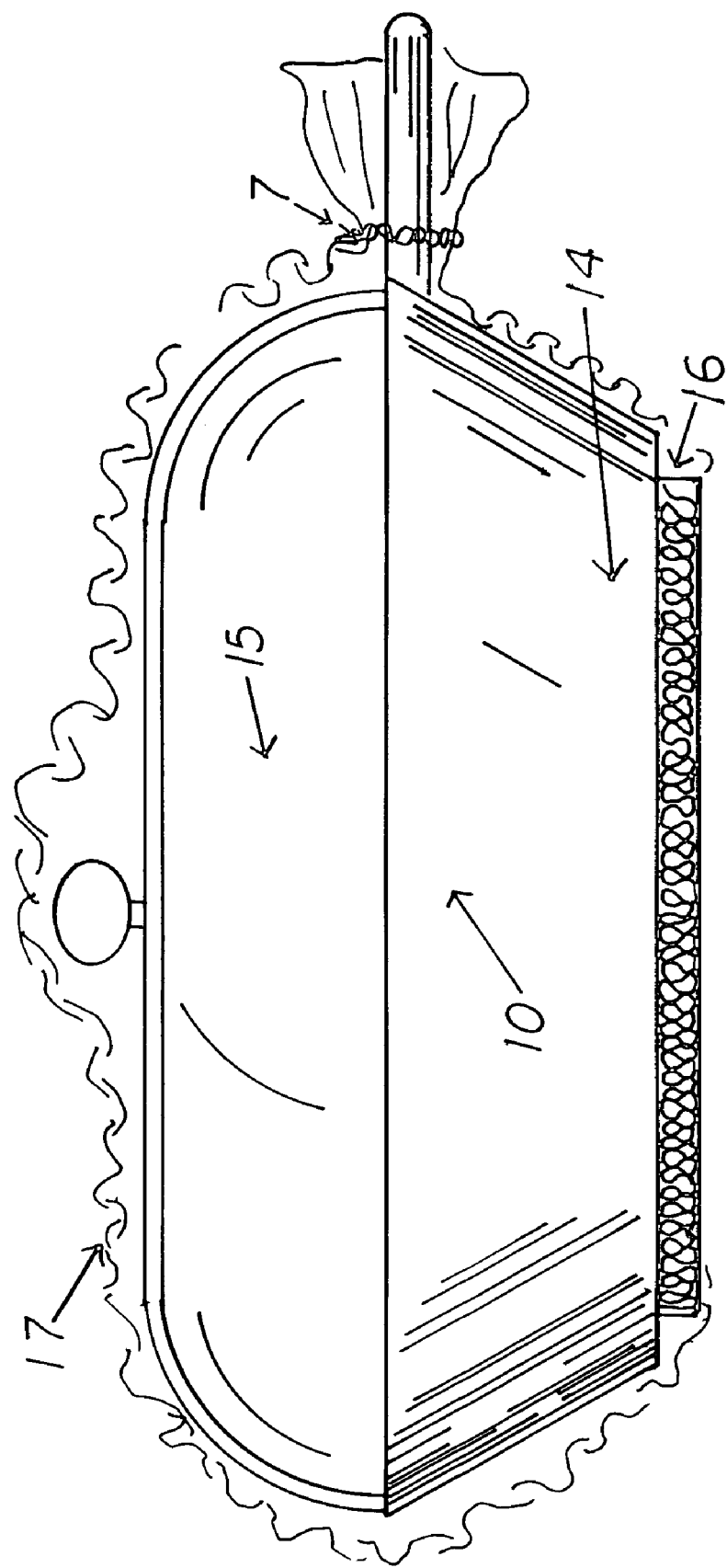

FIG. 5. Illustrates the cooking dishware. Illustrated is a metal frying pan, which absorbs and captures sunlight, thus storing the heat of the sun's energy in the thermal mass. On top is a clear glass lid that transmits the sun's light into the frying pan cooking chamber. On the bottom is an insulating pad that insulates and traps the sun's heat, and protects the solar cooker floor from excessive heat. Surrounding the entire assembly is a high temperature plastic bag to capture and store the sun's thermal energy, much like a greenhouse.

DETAILED DESCRIPTION

FIG. 1. Gives a perspective of the invented device. Shown is the sun's solar energy (1), which redirects the sun's solar energy (1) to the solar cooking area dishware (10). Sunlight bounces off the moveable-upper-reflective-panel (3). This moveable-upper-reflective-panel (3) is moveable up and down, hinged off the vertical-reflective-back-plate surface (5). On the sides are a left triangle-shaped-reflective-side-plate (11) and a right triangle-shaped-reflective-side-plate (13) The reflective interior captures any stray sunlight and redirects it downward towards the solar cooking area dishware (10). Below is another reflective and moveable panel (2). This moveable-lower-reflective-panel (2) is hinged off the lower horizontal-reflective-floor-plate. (12). The second panel (2) redirects the sun's solar energy to the solar cooking area dishware (10). Illustrated are holes (4) for pegs (18). This hole and peg (4,18) assembly is used to hold the moveable-lower-reflective-plate (2) and moveable-upper-reflective-plate (3) in place, and unmovable even in the wind. This allows the user to adjust the moveable-lower-reflective-plate (2) and the moveable-upper-reflective-plate (3) to the desired angled to reflect the sun's solar energy onto the solar cooking area dishware (10). Also, illustrated are two holes (9), which can be used to lock the moveable-lower-reflective-plate (2) and the moveable-upper-reflective-plate into lowered position using a peg. This creates a storage space for after-use for the dishware, and other accessories.

Figure 2:
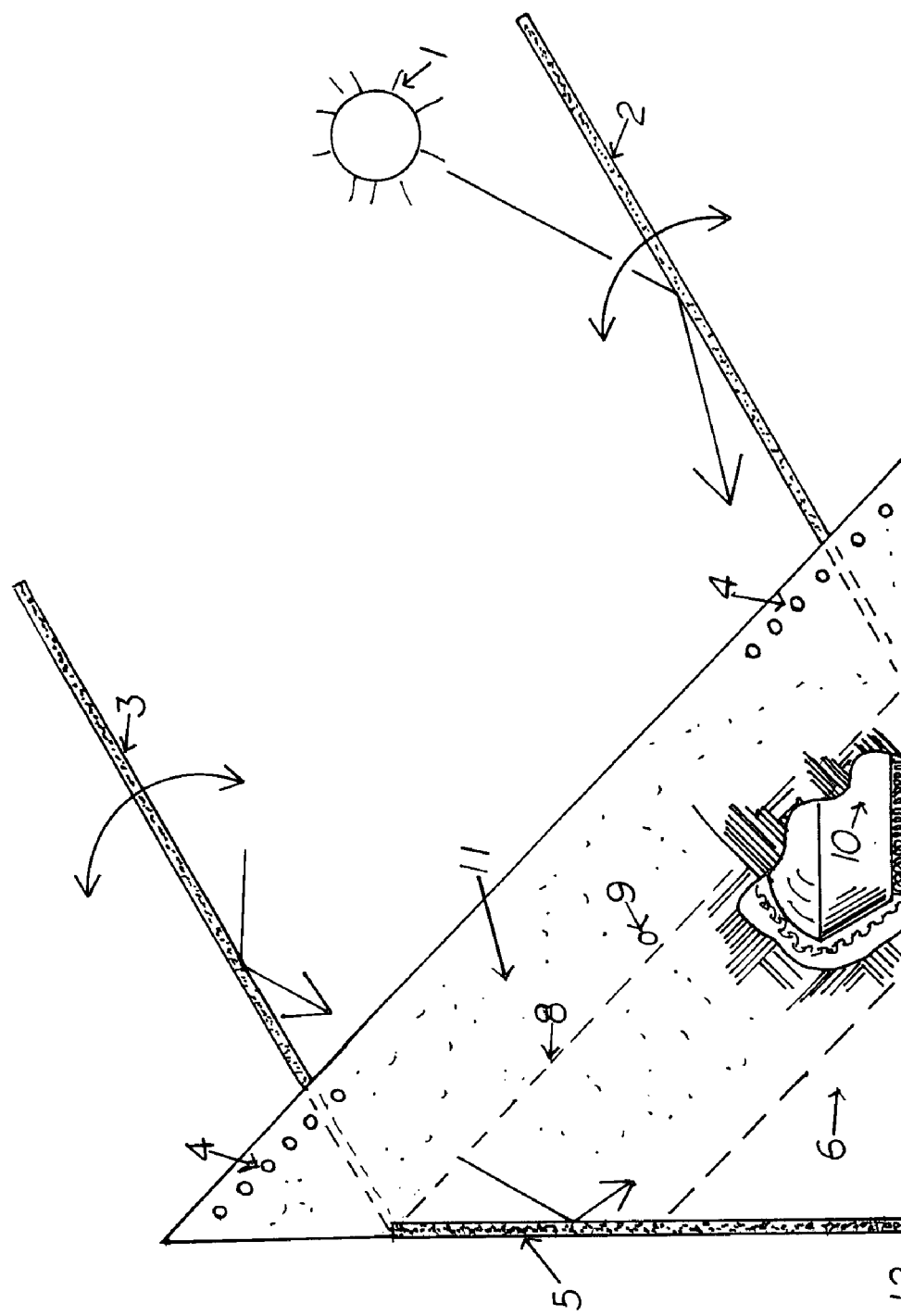

FIG. 2. shows a side elevation of the invented device. The sun's solar energy (1) bounces off two moveable reflective panels (2, 3) as shown by straight arrows. The movement of the moveable-lower-reflective-panel (2) and the moveable-upper-reflective-panel (3) is shown by curved arrows. The light bounces off the invented device onto the vertical-reflective-back-plate (5) and onto the horizontal-reflective-floor-plate (12). Holes are shown for the pegs. These holes (4) are used to adjust the location and angle of the moveable reflective panels (2, 3). Shown also is a hole (9) for locking the reflective panels (2,3) into a lowered position, thus creating a storage space for the solar cooking area dishware (10).

As shown by the dotted line (8), the two reflective panels (2, 3) are lowered thus trapping anything desired to be stored in the created cavity. Shown also is the claimed reflective-tilted-equilateral-triangle-plate (6). This reflective-tilted-equilateral-triangle-plate captures light from the sun's solar energy (1), using the moveable-lower-reflective-panel (2), the moveable-upper-reflective-panel (3), and from the vertical-reflective-back-plate (5), and the horizontal-reflective-floor-plate (12), and also any stray light from the left triangle-shaped-reflective-side-plate (11) and the right triangle-shaped-reflective-side-plate (13). The claimed reflective tilted-equilateral-triangle-plate with each of the three angles at 60 degrees in all three horizontal and vertical dimensions (6) redirects the sun's solar energy (1) towards the solar cooking area dishware (10).

FIG. 3. Illustrates a frontal view of the invented device. Overhead is a moveable-upper-reflective-triangular-reflective-plate panel (3), held in place by a peg (18). The peg (18) can be in front and also behind the upper-moveable-reflective-panel (3), thus trapping it, and keeping it unmovable, even in wind. Also shown is a moveable-lower-reflective-panel (2), held in place by a peg (18). There can be also another peg (18) on top of the moveable-lower-reflective-panel (2) to hold the panel (2) in place, even in wind. Shown also is the vertical-reflective-back-plate (5), and the horizontal-reflective-floor-plate (12). Shown also is the left triangular triangle-shaped-reflective-side-plate (11) and the right triangle-shaped-reflective-side-plate (13). All of which focus the sun's solar energy (1) downwards towards a solar cooking area dishware (10).

FIG. 4. Illustrates the claimed reflective tilted-equilateral-triangle-plate with each of the three angles at 60 degrees in all three horizontal and vertical dimensions (6). This is positioned in the dual corners of the invented device. The claimed reflective tilted-equilateral-triangle-plate with each of the three angles at 60 degrees in all three horizontal and vertical dimensions (6) is adjacent to the vertical-reflective-floor-plate (12), and also adjacent to the horizontal-reflective-back-plate (5). There are two of these (6). This claimed reflective tilted-equilateral-triangle-plate with each of the three angles at 60 degrees in all three horizontal and vertical dimensions (6) is adjacent also to the right triangle-shaped-reflective-side-plate (13), and in the opposite hand is adjacent to the left triangle-shaped-reflective-side-plate (11). The claimed reflective tilted-equilateral-triangle-plate with each of the three angles at 60 degrees in all three horizontal and vertical dimensions is used to capture light from all reflective surfaces (5,11,12,13) and redirect it towards the solar cooking area dishware (10). The net result is a concentration of solar energy.

FIG. 5. illustrates the solar cooking area dishware (10). The frying pan (14) may be made of metal, like cast iron. This stores and captures the heat of solar energy, and with the thermal mass keeps hot, even if a cloud is overhead. Underneath the frying pan (14) is an insulating pad (16), which traps the heat of the frying pan (14), but also prevents heat from being conducted to the invented device. Overhead of the frying pan (14) is a clear or glass lid (15). This allows light to be transmitted to the frying pan (14). Surrounding the entire assembly (10, 14, 15, 16) is a clear plastic bag (17) that is designed not to melt in heat. The clear plastic bag (17) captures solar heat, like a greenhouse, keeping the entire solar cooking area hot (10). The low center of gravity, caused by the solar cooking area dishware (10) being located at the bottom holds the entire invented device stable even in wind. A tie (7) seals the plastic bag (17).

I claim:

1. A solar cooker comprising:
    a reflective-tilted-equilateral-triangle-plate tilted at 60 degrees in all three horizontal and vertical dimensions in said solar cooker, one side of said reflective-tilted-equilateral-triangle-plate adjacent and attached to a horizontal-reflective-floor-plate, a second side of said reflective-tilted-equilateral-triangle-plate adjacent and attached to a vertical-reflective-back-plate, and a third side of said reflective-tilted-equilateral-triangle-plate adjacent and attached to a triangle-shaped-reflective-side-plate, a second triangle-shaped-reflective-side-plate, each of said triangle-shaped-reflective-side-plates positioned vertically, said triangle-shaped-reflective-side-plate attached to one side of said vertical-reflective-back-plate and one side of said horizontal-reflective-floor-plate, said second triangle-shaped-reflective-side-plate attached to an opposite side of said vertical-reflective-back-plate and an opposite side of said horizontal-reflective-floor-plate, said triangle-shaped-reflective-side-plates containing holes for a moveable-reflective-lower-panel and holes for a moveable-reflective-upper-panel, said holes contain pegs to hold said moveable-reflective-lower-panel to said horizontal-reflective-floor-plate and said moveable-reflective-upper-panel to the vertical-reflective-back-plate, said moveable-reflective-lower-panel hinged to said horizontal-reflective-floor-plate, and said moveable-reflective-upper-panel hinged to vertical-reflective-back-plate, the horizontal-reflective-floor-plate attached and perpendicular to the vertical-reflective-back-plate, said reflective tilted-equilateral-triangle-plate captures reflected light from one or more of said horizontal-reflective-floor-plate, vertical-reflective-back-plate, moveable-reflective-lower-panel, moveable-reflective-upper-panel, and triangle-shaped-reflective-side-plates, to redirect and concentrate the sun's solar energy towards dishware in a solar cooking area within said solar cooker.

* * * * *